US010536329B2

(12) United States Patent
Khemani et al.

(10) Patent No.: US 10,536,329 B2
(45) Date of Patent: Jan. 14, 2020

(54) ASSISTED CONFIGURATION OF DATA CENTER INFRASTRUCTURE (71) Applicant: Dell Products L.P., Round Rock, TX (US)

(72) Inventors: Lucky Pratap Khemani, Bangalore (IN); Pavan Kumar, Bangalore (IN); Suren Kumar, Vellore (IN); M V R Krishna Reddy Karri, Kavitam (IN)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 15/610,638

(22) Filed: Jun. 1, 2017

(65) Prior Publication Data
US 2018/0351790 A1  Dec. 6, 2018

(51) Int. Cl.
*H04L 12/24* (2006.01)
*G06F 3/06* (2006.01)
*H04L 29/06* (2006.01)

(52) U.S. Cl.
CPC ............ *H04L 41/08* (2013.01); *G06F 3/0604* (2013.01); *G06F 3/0619* (2013.01); *G06F 3/0653* (2013.01); *G06F 3/0668* (2013.01); *H04L 69/18* (2013.01)

(58) Field of Classification Search
None
See application file for complete search history.

(56) References Cited

U.S. PATENT DOCUMENTS

| 5,991,826 | A | * | 11/1999 | McGee | G06F 9/4411 710/10 |
| 8,275,936 | B1 | * | 9/2012 | Haywood | G06F 13/1657 365/189.05 |
| 2011/0296404 | A1 | * | 12/2011 | Zhang | G06F 8/658 717/178 |
| 2013/0013753 | A1 | * | 1/2013 | Zessin | G06F 9/4411 709/221 |
| 2015/0026385 | A1 | * | 1/2015 | Egi | H04L 47/785 710/314 |
| 2015/0324312 | A1 | * | 11/2015 | Jacobson | G06F 13/4022 710/104 |
| 2016/0276016 | A1 | * | 9/2016 | Benedict | G11C 5/025 |

* cited by examiner

*Primary Examiner* — Sargon N Nano
*Assistant Examiner* — Christopher B Robinson
(74) *Attorney, Agent, or Firm* — Jackson Walker L.L.P.

(57) ABSTRACT

A configuration assistance module (CAM) includes a configuration monitor (CM), a configuration analyzer (CA), and a configuration database of one or more supported platform configurations. The CM may and collect hardware and software inventory, e.g., PCIe matrix information, DIMM matrix information, blade configuration information and configuration information for various resources. The CAM may compare the current configuration to the supported configurations, report discrepancies through alerts, and create assist reports. An assist report may be stored to a remote share or master partition and displayed to a GUI, console interface, or the like. The CA module may take an assist report as input and create an analytics report, which may proactively provide inputs for future configurations.

18 Claims, 7 Drawing Sheets

| DIMM Feature | Combine | Rules |
|---|---|---|
| Mixed Type (RDIMM / UDIMM) | No | Not Supported |
| Mixed Ranks | Yes | Single (SR) and Dual Rank (DR) DIMMs can be mixed. If mixing SR or DR with Quad Rank (QR) DIMMs, the first slot of each channel populated (first two white tab DIMM slots on each processor: A1, A2, B1 & B2) must be populated with the QR DIMM. Only two QR DIMMs are permitted per channel because the maximum of total ranks per channel is 8. |
| Mixed Capacity | Yes | All populated channels must have the same DIMM arrangement. Example with Channel 1: if bank A is populated with a 4GB DIMM (slot A1), bank B with 2GB (slot A4) and Bank C is empty (slot A7), all memory Channels must be populated that way. (see figure 5) |
| Mixed Speeds | Yes | If memory modules (DIMMS) with different speeds are installed, all DIMMs will operate at the speed of the slowest installed DIMM. Also, if any DIMMS (regardless of speed) are installed in the third bank (bank C: slots A/B 7, 8 or 9), the maximum system memory speed will be 800MHz. |
| Mixed Vendors | Yes | Mixed vendor configuration is permitted. Use of a common vendor for all DIMMs is recommended whenever possible. |

ASSISTED CONFIGURATION OF DATA CENTER INFRASTRUCTURE

TECHNICAL FIELD

The present disclosure generally relates to information handling systems and, more particularly, managing one or more information handling systems in a data center or other suitable network.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

Many problems reported by customers with respect to server instability, precision, identity, or storage/network performance, are attributable to an incorrect or suboptimal configuration by the customer. Moreover, an incorrect or suboptimal configuration reported by one customer may be the same as or substantially similar to a configuration error reported by a second customer. If both customers initiate customer support inquiries, the effort required to identify and resolve the first customer's issue may be substantially and undesirably duplicated for the second customer.

SUMMARY

A configuration assistance module (CAM) disclosed herein may be implemented on a baseboard management controller (BMC) of an information handling system. The CAM may include a configuration monitor (CM), a configuration analyzer (CA), and one or more databases of supported configuration information. The one or more configuration databases may include a local configuration database, maintained by and stored on the BMC, and a management configuration database stored on and maintained by a management server. The CAM may synchronize the local configuration database with the management configuration database from time to time.

In at least one embodiment, the CM may monitor information handling resources of the information handling system to determine or otherwise obtain configuration information indicating the information handling system's current hardware and software configuration. The configuration information may include information pertaining to a wide variety of information handling resources and their attributes including, as non-limiting examples, I/O module (IOM) configuration information including peripheral components interconnect express (PCIe) configuration information.

The CM may create, initialize, and maintain the local configuration database, which may store a snapshot or point in time representation of some or all information handling system configurations that are known to be valid, functional, and/or optimal configurations of the information handling system. The CM may discover, acquire, or otherwise obtain hardware and software inventory information, including physical connection and interconnection information. Such physical connection and interconnection information may include, as non-limiting examples, PCIe slot matrix information indicating which PCIe cards are populating which PCIe expansion slots, DIMM slot matrix information indicating which DIMM slots are populated and one or more attributes of the various DIMMs. Similarly, configuration information indicative of various blade, IOM, fan, and PSU configuration attributes as well as firmware, serial number, service tag, and other such information may be included in the configuration information obtained by the CM.

The CM may still further compare the current configuration to information indicative of one or more supported configurations stored in the local configuration database. If the current configuration does not match with any of the recognized configurations stored in the local configuration database, the CM may report any discrepancies by generating alerts and by generating a document referred to herein as an assist report. The assist report may identify the current configuration that failed to match any of the supported configurations. The assist report may be stored to a remote share or master partition and provided to a GUI, console interface, simple network messaging protocol (SNMP) interface, a Web Service (WS) interface, or the like. The CA may receive an assist report as input and create an analytics report that pro-actively provides inputs for future configurations.

In accordance with disclosed systems and methods for providing configuration assistance for an information handling system, configuration information is obtained by a BMC or another suitable resource. The configuration information indicates a current configuration of one or more information handling resources of the information handling system. The current configuration is compared for a match with any of one or more supported configurations. The supported configurations may be stored in a database that is local to the BMC. The local database may be synchronized from time to time with a management database stored on, accessible to, or otherwise maintained by management resources including a management server.

The BMC may be configured to respond to determining that the current configuration of the information handling system does not match any of the one or more supported configurations by performing exception operations. The exception operations may include generating an assist report indicative of the current configuration and, responsive to determining the current configuration comprises a working solution, update a database of supported configurations to include the current configuration.

If the BMC determines that the current configuration is a non-functional or otherwise suboptimal configuration, the BMC may attempt to correlate or otherwise associate the assist report and/or the current configuration with a previously encountered configuration. Data indicative of previously encountered exception configurations may be stored in the local configuration database or a different database of previously encountered configurations. Any resolution of the previously encountered configuration may also be included in the database and, if so, may be used to generate recommendations or take corrective configuration action. For example, if the current configuration is non-functional or otherwise suboptimal and the BMC is able to associate the current configuration with a prior exception configuration, the BMC may provide information, including information instructive of a possible resolution of the current configuration, to an administrator and thereby resolve the configuration issue locally.

If no previously encountered configuration corresponding to the current configuration is recognized, the method may await resolution of one or more configuration issues performed by an administrator using, for example, a configuration console or other suitable interface for configuring the information handling system. When the administrator eventually resolves any configuration issue raising an exception, the BMC may record the suboptimal configuration and the resolved configuration.

The monitoring, identifying, and determining of a system's current configuration and the maintenance and synchronization of a local database indicating the supported configurations may be implemented entirely or substantially in a BMC.

The BMC disclosed herein may be suitable for identifying and resolving configuration issues associated with various types of expansion slots including, as examples, PCIe slots and dual inline memory module (DIMMs) slots. The configuration information may include slot information indicative of information handling resources associated with one or more types of expansion slots including, without limitation, PCIe slots and DIMM slots. With respect to PCIe slots, in particular, a proposed solution may be verified for compliance with card and slot matrix priority data indicative of preferred slot placements for particular PCIe cards.

In the case of DIMM resources, the configuration information may be indicative of whether the DIMM resources are configured in a balanced memory configuration. The CM may generate an exception if an unbalanced memory configuration is encountered. Configuration information corresponding to DIMMs may include rank, capacity, speed, and vendor information. The CM may be configured to assess the DIMM configuration including any DIMM slot matrix and/or rules defining a balanced memory configuration. In addition to identifying unbalanced DIMM configurations, the CM may be configured to generate an alert when a DIMM resource is suspected of being implemented in a suboptimal manner.

In addition to PCIe slot matrix configuration information and DIMM slot configuration, additional configuration information that may be monitored by the disclosed CAM includes, as a non-limiting example, RAID controller configuration information indicative of connections between one or more shared RAID controllers and one or more disk enclosures. Configuration information may further include information indicating associations between modular information handling resources and chassis slots as well as any other information indicative of the information handling resources deployed in an information handling system and the manner in which the resource is connected or otherwise coupled to a central processing unit or to another information handling system resource.

The CAM may be configured to establish a local configuration database and store the local configuration database on a BMC of the information handling system, where the local configuration database indicates supported configurations. The CM may periodically synchronize the local configuration database to or with a management configuration database. The management configuration database may be maintained on a management network remote from any of the managed information handling systems and may receive configuration updates identifying new configurations from a plurality of managed information handling systems.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

A disclosed CAM includes the CM, the CA, and one or more local configuration databases including known good configurations, also referred to herein as supported configurations, of the information handling resources included in the information handling system. The CM may create and maintain a local database of supported configurations of the infrastructure platform and synchronize the local database with a network configuration database. The CM may be configured to monitor and identify the configuration of any of various information handling system platforms including, as non-limiting examples, a modular platform including a chassis and blade/sled resource, a rack mount platform, a tower platform, or another suitable platform. The configuration information that the CM obtains may include information pertaining to the information handling system's hardware and software inventory including, as non-limiting examples, PCIe slot matrix information indicating associations between particular PCIe slots and PCIe cards and other PCIe resources, DIMM matrix information indicative of associations between DIMM slots and the DIMMs that populate those slots as well as information indicating DIMM attributes of the corresponding DIMMs. The CM may monitor and document configuration information indicative of one or more blade configuration attributes, one or more IOM attributes, one or more fans attributes, and so forth.

The CM may determine or otherwise obtain the current configuration of an information handling system, compare the current configuration with supported configurations stored in the local database, alert an administrator of any configuration discrepancies or exceptions, and generate a discrepancy document referred to herein as an assist report. The assist report may be copied to a remote share or master partition and reported to an administrator as an alert via a GUI, a console, SNMP interface, etc.

The CA may receive assist reports and use the assist reports to assist in the resolution of future configuration exceptions and discrepancies. For example, after a configuration discrepancy that results in an assist report is resolved, the resolved configuration may be associated with the assist report and used to provide guidance following a subsequent and similar exception from a different customer or other user who encounters the same or similar configuration discrepancy.

The CA may be configured to provide system administrators with recommendations for configuring the PCIe matrix and/or the DIMM matrix. In some embodiments, when a PCIe priority conflict arises, an administrator may resolve the conflict manually based, at least in part, on PCIe matrix information that includes card priority and slot priority information for the information handling system. Slot priority information may indicate one or more PCIe slots ordered according to the slot preferences of the particular PCIe card. Card priority information may indicate priority between any two PCIe cards that share a slot priority in common. For example, if a first PCIe card and a second PCIe card both identify PCIe slot 6 as the most preferred PCIe slot, the relative card priorities of the two cards may determine which of the two cards is inserted in slot 6. The CA may identify available slots for a particular card and, if all of the slots are occupied, rearrange one or more cards until each card resides in a suitable slot. The CA may register working solutions for the PCIe slot matrix and use the registered configurations to guide the configuration of future information handling systems. Similarly, the CA may register blue prints of all working solutions of the various information handling resources including the DIMM matrix, fan matrix, sled matrix, and so forth. The CA may receive an assist report as input and create an analytics report, which pro-actively provides inputs for future configurations. In addition, the CAM may provide expert suggestion for self-configuration of chassis and server platforms.

In this manner, the CAM may provide console administrators support or assistance for workable configurations. The CAM may be implemented in a service processor, remote access controller, baseboard management controller, or the like of a chassis or server. In one embodiment, the CAM may be configured to prohibit system boot if the current configuration is suboptimal, ensuring that a known good configuration is implemented. This feature can be extended to include a mandatory diagnostic during boot process.

Figure 1:
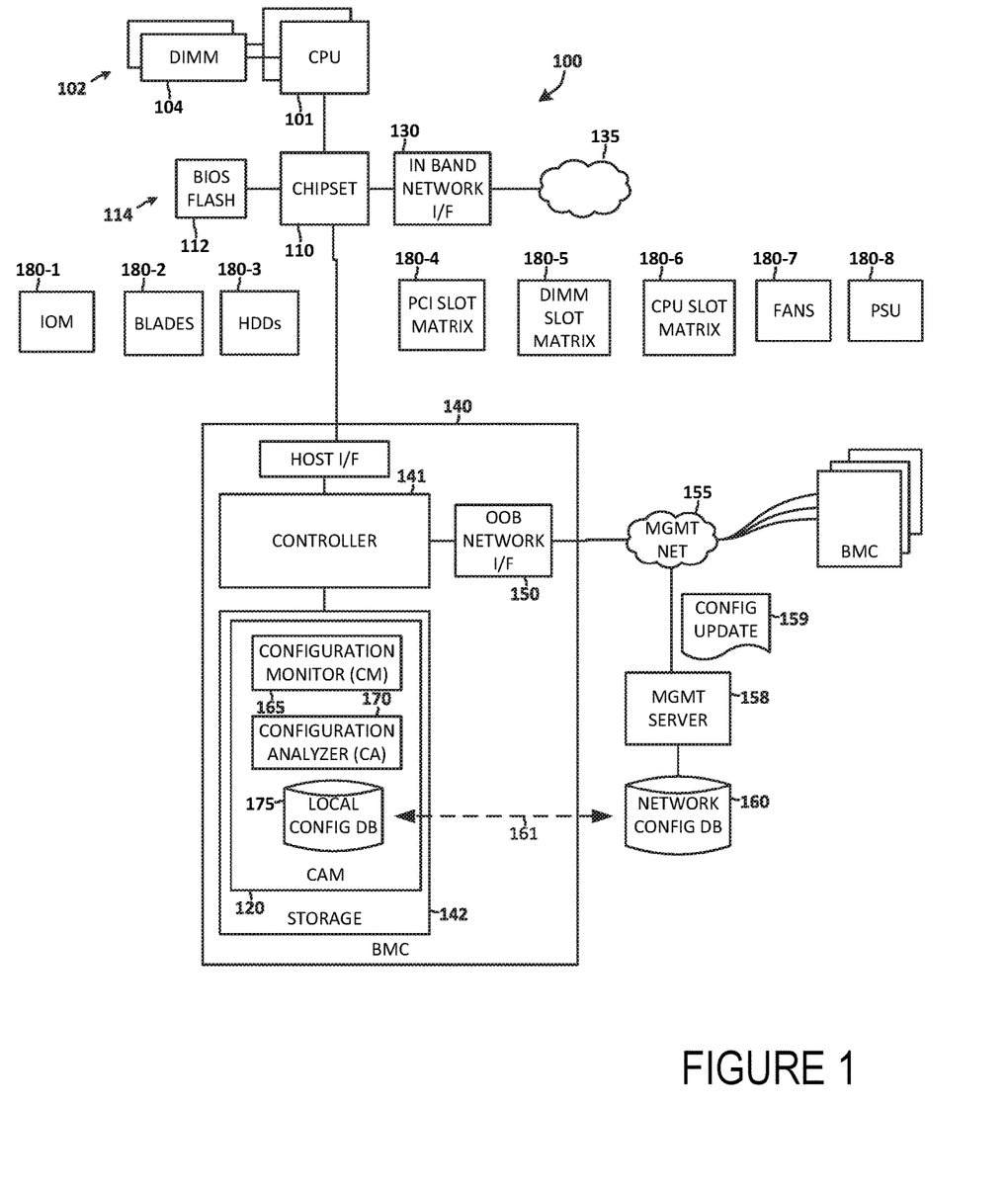
FIG. 1 illustrates a block diagram of an information handling system including a CAM in accordance with disclosed subject matter.

Referring now to FIG. 1, a block diagram of an information handling system 100 suitable for implementing disclosed assisted configuration management features is disclosed. The information handling system 100 illustrated in FIG. 1 includes a central processing unit (CPU) 101, which may comprise one or more physical processors, coupled to a system memory 102. The CPU 101 illustrated in FIG. 1 may include an integrated memory controller (not depicted) coupling CPU 101 to system memory 102. In other embodiments, not depicted in FIG. 1, a memory controller that is distinct from CPU 101, may be incorporated within one of one or more chip set devices.

System memory 102 may include dynamic random access memory (DRAM), which may be implemented in one or more DIMMs 104. DIMMS 104 may include one or more non-volatile DIMMs (NVDIMMs). System memory 102 may include processor-executable instructions and/or one or more data structures. The system memory 102 illustrated in FIG. 1 includes at least portions of CAM 120 suitable for implementing one or more configuration assistance features disclosed herein.

The information handling system 100 of FIG. 1 further includes a chip set 110 coupled to CPU 101. Chip set 110 may be configured to provide an interface between CPU 101 and various input/output (I/O) peripherals and interfaces.

A basic input/output system (BIOS) flash storage device 112 stores BIOS instructions 114, also referred to herein simply as BIOS 114. BIOS 114 may include the first instructions executable by information handling system 100 following a system reset and BIOS 114 may include instructions enabling CPU 101 and/or information handling system 100 to detect system resources and initialize them to a known state. A network interface, referred to herein as in-band network interface 130, coupled to chip set 110 of information handling system 100 couples information handling system 100 to an external network 135, which may encompass one or more private networks and one or more public networks including the Internet.

FIG. 1 further illustrates a BMC 140 coupled to CPU 101 via one or more interfaces supported by chip set 110 and CPU 101. The BMC 140 of FIG. 1 includes an embedded controller 141 coupled to storage resource 142, which may include DRAM storage, non-volatile storage, e.g., flash memory storage, or a combination of both. In addition, a network interface referred to herein as out-of-band network interface 150 provides an interface between controller 141 and an external network, referred to herein as management network 155, via which controller 141 may communicate with one or more management server 158.

Management server 158 may be configured to manage information handling systems including information handling system 100. In at least one embodiment, management server 158 is configured to manage all information handling systems having a BMC 140 or another suitable management endpoint or agent coupled to management network 155. For example, management server 158 may be configured to manage all of the information handling systems in a data center or other suitably defined network of information handling systems.

The management server 158 illustrated in FIG. 1 is coupled to a network configuration database 160 that may include information pertaining to all configurations and platforms recognized or otherwise supported by the management server 158. The platforms and configurations supported by network configuration database 160 may encompass rack server platforms as well as chassis/modular platforms and the configuration information that may be monitored by CAM 120 includes PCIe slot matrix configuration information, DIMM slot matrix information, fan matrix information, etc. With respect to chassis modular platforms, configuration information that may be monitored includes information for all possible STASH, Sleds, and so forth, all supported blades, RAID controllers, including shared RAID controllers, mezzanine cards including network daughter cards, PCIe slot-to-blade mappings, just a bunch of disk (JBOD) configurations including RAID controller to JBOD configuration information, power supply configurations, etc.

FIG. 1 illustrates synchronization 161 that may occur between the network configuration database 160 and the local configuration database 175 of information handling system 100. FIG. 1 illustrates a number of BMCs 140 coupled to management server 158 via management network 155. Each BMC 140 may represent the management agent for a corresponding information handling system. In this embodiment, network configuration database may receive updates 159 of new configurations from any of the information handling systems within the management networked, i.e., the information handling systems, including information handling system 100, coupled to management network 155 and management server 158. In some embodiments, the definition of a managed system may be more formally limited to information handling systems that have established a trusted and verifiable relationship with management server 158.

FIG. 1 further illustrates a synchronization example in which a configuration update 159 is pushed from the management server 158 to information handling system 100 and, in at least some embodiments, to all or some of the other information handling systems in the managed network. Synchronization may also occur, in at least some embodiments, when information handling system 100, or another managed information handling system, identifies a new, functional, and optimal configuration, which may trigger a synchronization event in which the new configuration information is pushed from information handling system 100 to management server 158 and network configuration database 160. In this example, management server 158 may receive configuration updates 159 identifying new known good configurations from a number of information handling system within the managed network. From time to time, e.g., hourly, daily, etc., management server 158 may aggregate all configuration updates 159 acquired from the information handling system in the managed network and distributed the aggregated update to each of the information handling system. In this manner, the management server distributes all newly recognized configurations to all managed systems, thereby potentially reducing the number of exceptions that occur within the managed network as a whole. Similarly, for embodiments that record assist reports and the corresponding configuration information, information regarding a configuration issue encountered for the first time on information handling system 100 may be distributed to the other information handling systems in the managed network to provide any guidance acquired during the resolution of the system first exhibiting the exception. An update package resource may be configured to distribute updates to firmware, software, and other resources of information handling system 100.

The BMC 140 illustrated in FIG. 1 includes CAM 120 suitable for implementing configuration assistance features disclosed herein. The CAM 120 of FIG. 1 is implemented as a plurality of processor-executable instructions and one or more configuration databases including a local configuration database 175 stored in storage resource 142. In any such embodiment, some or all of the instructions may also reside in DRAM or other dynamic storage, such as when controller 141 is executing CAM instructions.

The CAM 120 of FIG. 1 includes CM 165, CA 170, and a local configuration database 175. Like CAM 120, CM 165 and CA 170 may be implemented as a plurality of processor-executable instructions stored in storage resource 142.

Information handling system 100 may include one or more configurable hardware resources, each of which may be communicatively coupled to CAM 120. In at least one embodiment, the CM 165 may be configured to discover or otherwise obtain configuration information pertaining to each information handling resource 180. The information handling resources 180 illustrated in FIG. 1, which are illustrative and not exhaustive, include IOM 180-1, modular information handling resources, also referred to herein simply as blades 180-2, one or more hard disk drive (HDD) enclosures 180-3, PCIe slot matrix 180-4, a DIMM slot matrix 180-5, a CPU slot matrix 180-6, one or more thermal fans 180-7, and one or more power supply units (PSUs) 180-8. Although a particular combination of configurable hardware resources is illustrated in FIG. 1, configuration assistance features disclosed herein are applicable to substantially any combination of configurable information handling resources.

CM 165 may be configured to discover or otherwise obtain current configuration information indicative of a current configuration of information handling system 100. CM 165 may be further configured to maintain local configuration database 175 and synchronize, from time to time, local configuration database 175 with the network configuration database 160. CM 165 may compare the current configuration with the supported configurations indicated in local configuration database 175. If CM 165 detects discrepancies between a current configuration and the supported configurations in local configuration database 175, CM 165 may report discrepancies via alerts provided to a reporting interface. The reporting interface may be configured to create a configuration assist report, which may be copied to a remote share or master partition. The configuration assist report may also be forwarded to CA 170 as input and CA 170 may generate an analytics report.

Communication between configurable information handling resources 180 and CAM 120 may occur either before or after information handling system 100 is booted to an operating system (OS). Pre-OS communication capability between CAM 120 and one or more information handling resources 180 may be provided in conjunction with BIOS of information handling system 100. Pre-OS communication capability may extend information handling system configuration monitoring and analyzing features described herein to enable configuration monitoring and analyzing while CPU 101 is in a sleep or suspended state.

In at least one embodiment, information handling system 100 is configured to maintain a remote, centralized database, referred to herein as a network configuration database 160.

Figure 2:
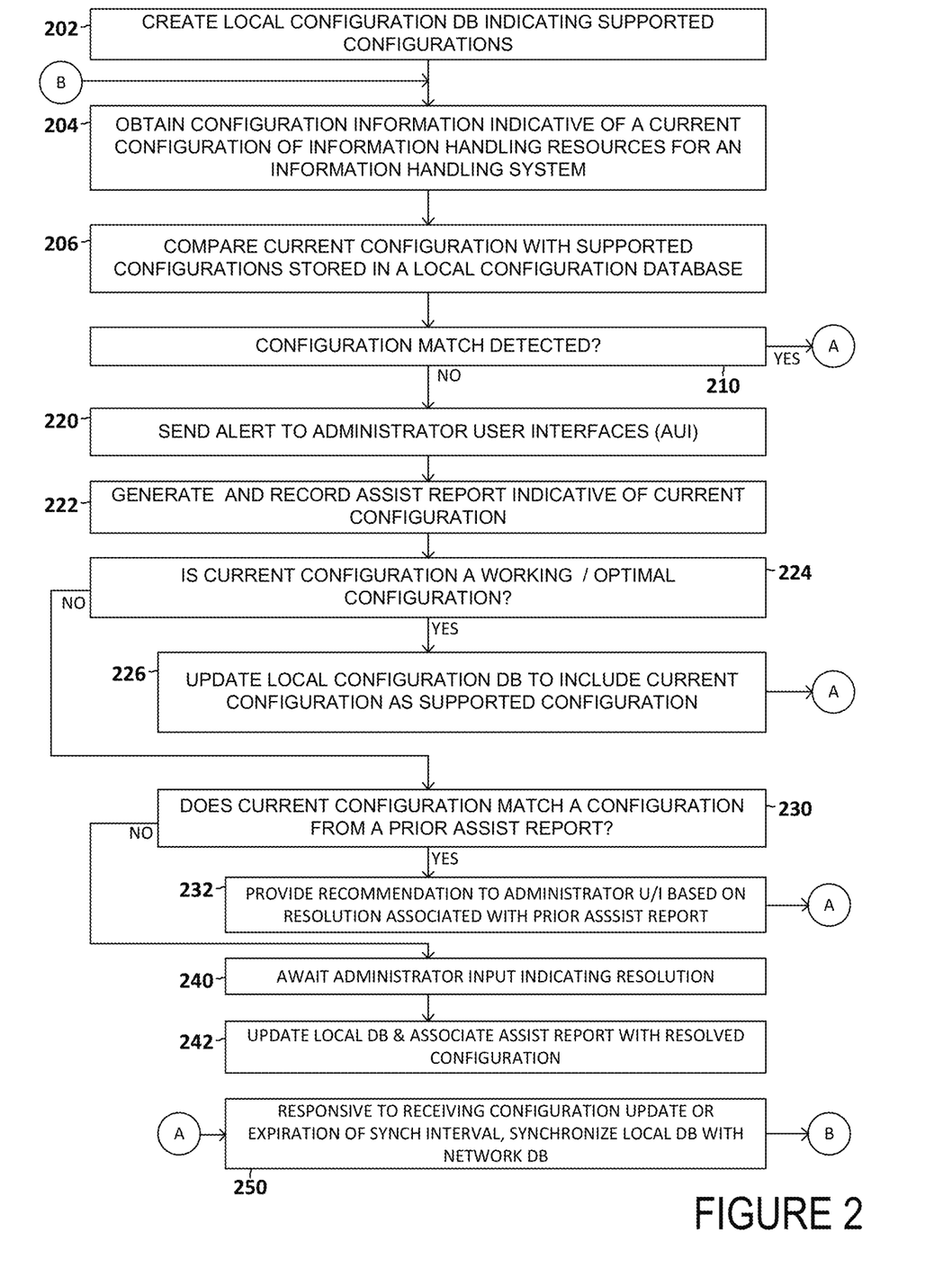
FIG. 2 illustrates a flow diagram of a configuration assistance method performed by the CAM of FIG. 1.

FIG. 2 illustrates a flow diagram of a method 200 for managing an information handling system such as the information handling system 100 of FIG. 1. The method 200 illustrated in FIG. 2 monitors the configuration of an information handling system and alerts administrators when a current configuration of the information handling system has one or more discrepancies with respect to a database of known good configurations. The method may include recommending solutions to at least some discrepancies when, as an example, a discrepancy has been previously encountered and resolved by the information handling system or somewhere else within the management network platform.

The method 200 illustrated in FIG. 2 includes creating (operation 202) a local configuration database for storing supported configuration information, i.e., information indicative of known good configurations of the information handling system. Creation of the local configuration database may include importing, downloading, or otherwise obtaining all or portions of a network configuration database such as the network configuration database illustrated in FIG. 1. As suggested by its name, the local configuration database may be stored in a memory device or another suitable storage resource of BMC 140.

Method 200 may include obtaining (operation 204) configuration information indicative of a current configuration of the information handling resources of the applicable information handling system. Current configuration may be obtained using suitable discovery resources, protocols, formats, languages, data structures, application programming interfaces (APIs), schemas, and the like including, but not limited to, various protocols and standards of the Distributed Management Task Force (DMTF). As an example, the current configuration may be discovered using a representational state transfer (REST) compliant interface such as the Redfish API that operates on JavaScript Object Notation (JSON) documents that describe the information handling system configuration in accordance with a configuration schema that enumerates the configuration attributes that a system or resource may declare.

After obtaining the current configuration, the method 200 illustrated in FIG. 2 compares (operation 206) the current configuration with one or more supported configurations stored in a local configuration database residing on the BMC. The configurations listed in the local configuration database may include all known good configurations of the information handling system. The known good configurations may be a subset of all permutations of available information handling resources that a system may include.

Known good configurations may refer to configurations that satisfy a set of one or more criteria or conditions. As an example, a known good configuration may refer to a configuration in which, among other conditions, the PCIe slot matrix is populated wherein each PCIe card included in the information handling system is attached to its primary priority PCIe slot. In other embodiments, known good configurations of the information handling system and the information included in local configuration database may differ. For example, in some embodiments, the local configuration database may include and/or recognize configurations referred to herein as suboptimal configurations. A suboptimal configuration may refer to a configuration in which one or more information handling resources is configured wherein the resource, while functional, may be unable to perform optimally. As an example, a PCIe card may be capable of beneficially utilizing more PCIe lanes than the card may utilize as configured within the information handling system. For example, a 16 lane (×16) or 32-lane (×32) PCIe card may be inserted in a PCIe slot that supports ×8 operation. In some embodiments, suboptimal configurations may generate alerts without halting operation while in some other embodiments, the CAM may be configured to prevent operation in a suboptimal configuration.

The method 200 illustrated in FIG. 2 then determines (operation 210) whether the current configuration of the information handling system matches a configuration stored in the local configuration database. If a match is detected, no further action is required and method 200 may jump to a synchronization sequence in which the local configuration database may be synchronized from time to time, whether periodically, asynchronously in response to a configuration event such as receiving a configuration update 159 (FIG. 1) from a management server, or otherwise.

In the event that the current configuration fails to match within any of the configurations included in the local configuration database, the illustrated method 200 proceeds to send (operation 220) alert information to one or more administrative user interfaces. Administrator user interface may include local interfaces, remote interfaces including console interfaces, and so forth. The alert represented by operation 220 may vary widely in the extent and format of information provided, from a simple audible alert that conveys little or no information regarding the current configuration, to a detailed alert that lists some or all of the current configuration details, identifies one or more resources that may have caused or contributed to the alert.

Upon alerting the applicable administrative interfaces, the method 200 of FIG. 2 generates (operation 222) a document or data structure referred to herein as an assist report, which may be record and associated with the alert and which may include information indicative of the current configuration.

The assist report may be recorded in the local configuration database or in another database (not depicted in FIG. 1) for use in conjunction with reporting and resolving configuration issues in the future.

The method 200 illustrated in FIG. 2 continues by determining (operation 224) whether the current configuration is a working and/or optimal configuration. Operation 224 may be included in recognition of the possibility that a current configuration, even if not previously encountered, may represent a functional or even optimal configuration. In such cases, it may be desirable to update (operation 226) the local configuration database such that the configuration will be recognized as a supported configuration in the future. In other embodiments, not depicted in the flow diagram of FIG. 2, an unrecognized configuration, i.e., a configuration that does not match with a configuration in the local configuration database may be prevented from updating the local configuration database as a means of preserving centralized control over the configuration databases maintained by each information handling system. The method 200 illustrated in FIG. 2 jumps to the database synchronization operation following completion of operation 226.

If, during operation 224, the current configuration is determined to be non-functional and/or sub-optimal, method 200 may execute operation 230 to determine whether the current configuration has been encountered previously. As indicated previously, some embodiments may record information regarding current configurations that are not recognized. This database of unrecognized configuration information, whether included within the local configuration database or within a different database, may be employed to detect and respond to configurations that may have been encountered previously.

FIG. 2 illustrates method 200 branching to operation 240 if the current configuration does not match any configuration from a previous assist report. On the other hand, if the current configuration is the same as or similar to a configuration documented in a previous assist report, the method 200 illustrated in FIG. 2 proceeds to operation 232. In operation 232, a recommendation may be generated and delivered to one or more administrators or administrator interfaces. The recommendation provide may simply inform the administrator that the current configuration appears to have one or more characteristics in common with a previously encountered configuration and may identify the applicable previously encountered configuration. However, if the issued that produced the previously encountered instance of the current configuration was resolved, the resolved configuration, i.e., the configuration that was implemented to transition the information handling system to a known good configuration may be reported to the administrator in the form of a message or alert informing the administrator that the current configuration appears to be similar to a previously encountered configuration. The administrator may be prompted to indicate whether the administrator wishes to reconfigure the information handling system in a manner similar to the manner in which the previous instance was resolved. Following any reconfiguration performed either automatically or manually following operation 232, method 200 may jumps to the synchronization operations.

Method 200 includes operation 240, which may execute following a determination in operation 230 that the current configuration has not been previously encountered. The operation 240 illustrated in FIG. 2 includes simply pausing or otherwise awaiting the administrator to reconfigure the information handling system. This operation recognizes that, in some embodiments, method 200 may lack knowledge necessary to address and resolve the applicable configuration issue. In the example of a PCIe matrix conflict, for example, the CAM 120 of FIG. 1 may lack access to a data structure that indicates the PCIe slot matrix for the applicable information handling system. In such cases, the administrator may be required to consult the PCIe slot matrix and identify and resolve any card and/or slot priority and/or conflict issues required. In other embodiments, however, CAM 120 may be configured to access a data structure containing or otherwise indicating the PCIe slot matrix for the information handling system and, in these embodiments, (not depicted in FIG. 2) CAM 120 may proceed to identify and recommend a configuration modification that may resolve the current discrepancy and/or result in a functional and optimal configuration.

Following completion of operation 240 the method 200 of FIG. 2 updates (operation 242) the local configuration database and associates the corresponding assist report with the resolved configuration, i.e., the configuration that resolved the configuration discrepancy or discrepancies that triggered the assist report.

The method 200 illustrated in FIG. 2 includes synchronization (operation 250) between the local configuration database 175 and the network configuration database (FIG. 1). Synchronization may be triggered periodically or asynchronously in response to an event.

Figure 3:
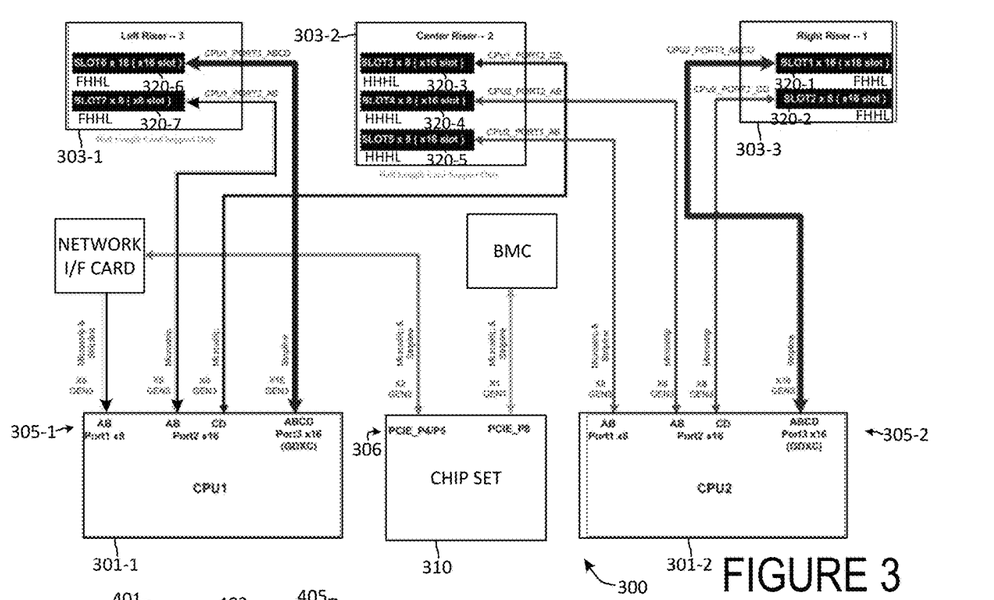
FIGS. 3-4 illustrate PCIe slot matrix information that may be monitored by the disclosed CAM.
Figure 4:
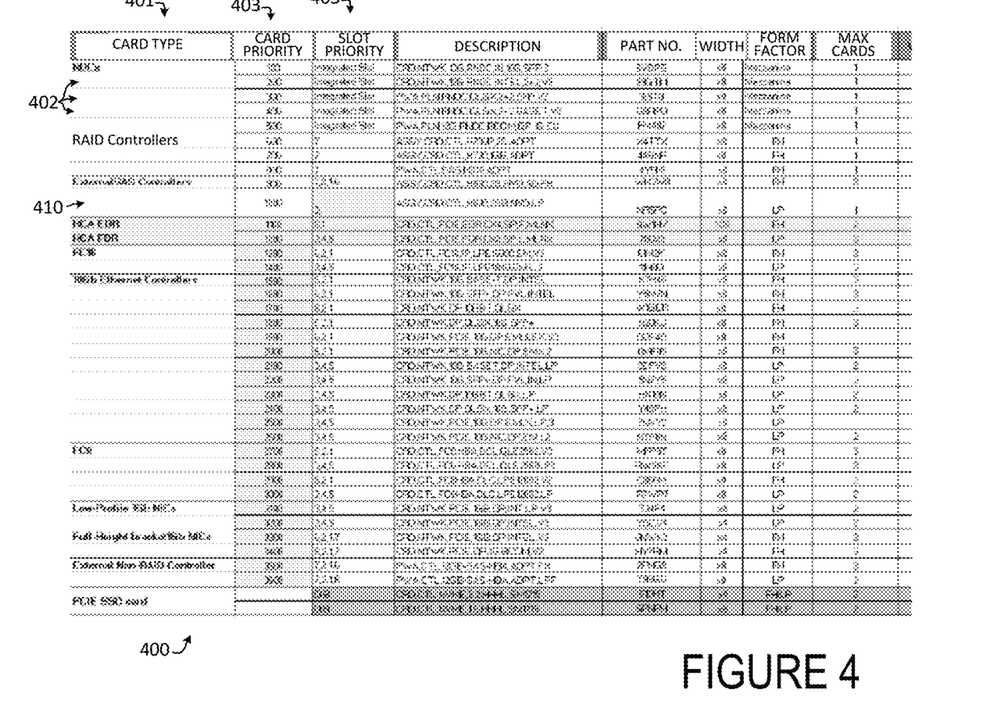

As suggested previously, CAM 120 detects and analyzes configuration information for a wide variety of information handling resources. FIG. 3 and FIG. 4 illustrate aspects of configuration information that CAM 120 may manage for the particular example of a PCIe slot matrix resource. FIG. 3 illustrates a PCIe configuration of an information handling system 300 that employs two CPUs, 301-1 and 301-2, and a chip set 310 to implement a total of seven PCIe slots 320-1 through 320-7 spread across three planars or circuit boards referred to as risers 303-1 through 303-3. FIG. 3 illustrates the connections between CPU PCIe signals 305 and the applicable PCIe slots 320 as well as the connections between chip set PCIe signals 306 and applicable PCIe slots 320. In addition, FIG. 3 illustrates half-height, half-length (HHHL) and full-height half-length (FHHL) form factors associated with each slot 320 and riser 303. Although illustrated in graphical form in FIG. 3, the PCIe slot matrix configuration information conveyed by FIG. 3 may be represented in as a data record.

FIG. 4 illustrates PCIe slot matrix table 400 that may be used, whether manually by a system administrator, or by CAM 120 and/or CA 170, to identify and potentially resolve PCIe configuration errors that result in unrecognized configurations. The PCIe slot matrix table 400 illustrated in FIG. 4 includes card and slot priority information for various PCIe card types indicated in column 401. Each particular PCIe card is represented by a row 402 in PCIe slot matrix table 400. For each card, the PCIe slot matrix table 400 of FIG. 4 indicates a card priority 403 and one or more slot priority values 405.

In at least one embodiment, any PCIe slot placement contention between two or more PCIe cards may be resolved according to PCIe slot matrix table 400. For any two PCIe cards, the card priority 403 indicates which of the two cards to assign to a PCIe slot first while the slot priority information indicates which PCIe slot or slots to populate. In the PCIe slot matrix table 400 illustrated in FIG. 4, the lowest value of card priority is assigned to a PCIe slot first. Thus, as an example, PCIe slot matrix table 400 indicates that external SAS Controllers have card priority over host channel adapters (HCA), fibre channel (FC) cards, and Ethernet controllers, but not over RAID controllers. As another example, the External SAS controller 410 has a card comparatively low priority value of 1000 and identifies PCIe slot 3 as the only compatible PCIe slot for this card. If the RAID controller 402 is introduced into an information handling system in which slot 3 is already populated, a reconfiguration may be required to move the PCIe card occupying slot 3 to different a different PCIe slot. Because most cards that may be installed in slot 3 may also be installed in slot 4 or slot 5, it may be possible to add external SAS controller 410 without creating a non-compliant configuration. If the external SAS controller 410 is inserted in slot 4 or slot 5, the CAM 120 may generate and alert and an assist report.

By monitoring PCIe configuration information including PCIe expansion slot information, in conjunction with a PCIe slot matrix table 400, the CAM 120 and CA 170 may be employed to detect and potentially resolve PCIe configuration errors.

Figure 5:
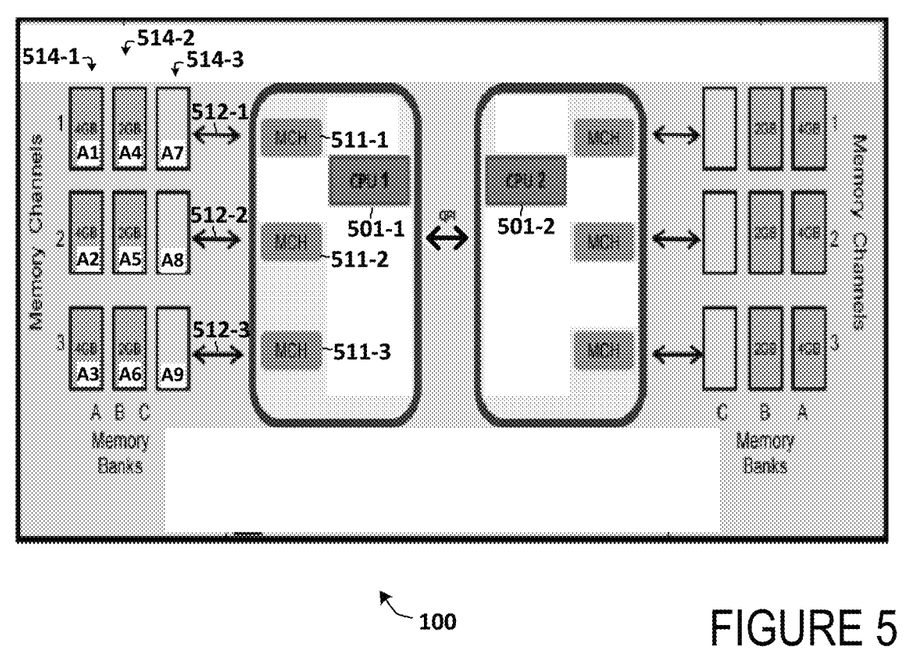
FIGS. 5-7 illustrate DIMM slot matrix information that may be monitored by the disclosed CAM.
Figure 6:
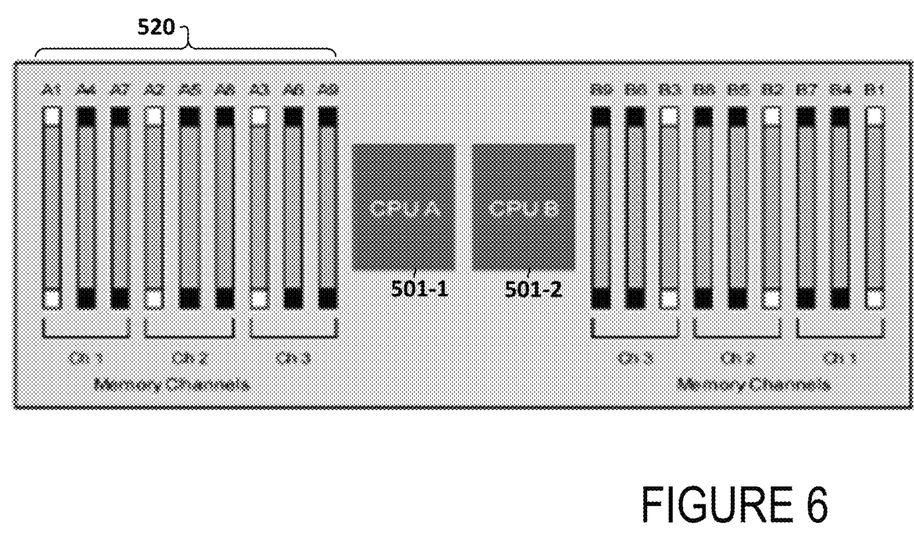
Figure 7:
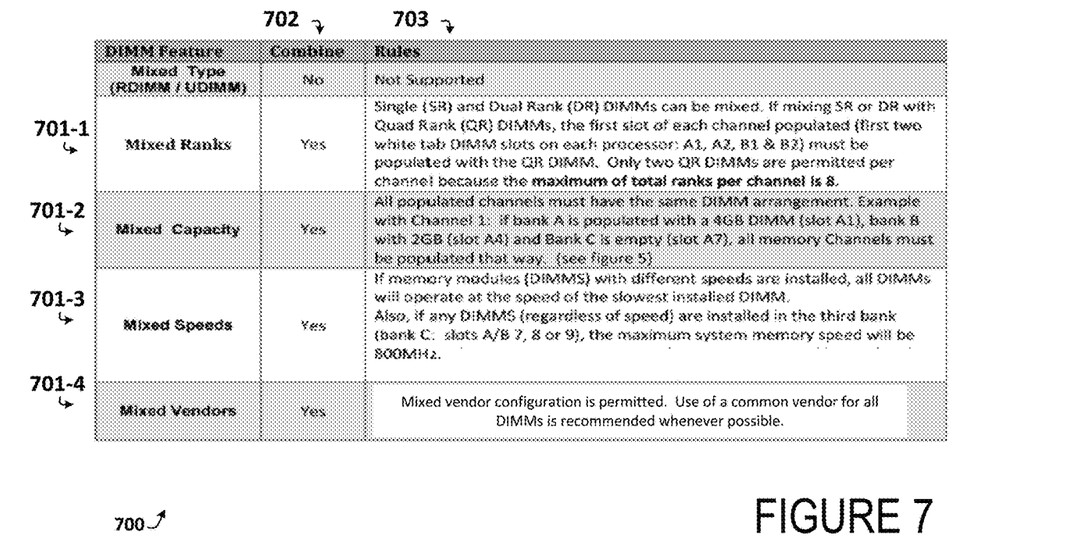

FIG. 5, FIG. 6, and FIG. 7 illustrate DIMM slot configuration details that may be monitored and managed by CAM 120. FIG. 5 illustrates an information handling system 500 employing a first CPU 501-1 and a second CPU 501-2, each of which includes three memory controller hubs 511-1 through 511-3 corresponding to three memory channels 512-1 through 512-3. Each memory channel 512 encompasses three banks 514-1 through 514-3. Subject to certain balanced memory conditions, some or all of the memory banks 514 of each memory channel 512 may be populated with a DIMM. FIG. 6 illustrates a physical layout of DIMM slots 520 with labeling identifying each DIMM slot 520 with a memory channel and memory bank tuple.

FIG. 7 illustrates a DIMM slot configuration table 700 indicating various DIMM configuration attributes 701-1 through 701-4 and the corresponding values 702 and rules 703 for each DIMM configuration attribute 701. The DIMM configuration attributes 701 correspond to the rank, capacity, speed, and vendor of each DIMM. The CM 165 may discover, for each DIMM device populating a DIMM slot 520, the DIMM's rank, capacity, speed, and vendor and determine, perhaps in conjunction with CA 170 whether the DIMM configuration complies with the DIMM configuration rules 703. Again, as was true for the PCIe configuration described with respect to FIG. 3 and FIG. 4, the determination of configuration compliance may be performed by an administrator to resolve a configuration conflict or exception manually or, alternatively, by the CAM 120 TO automate the verification of a DIMM configuration.

Figure 8:
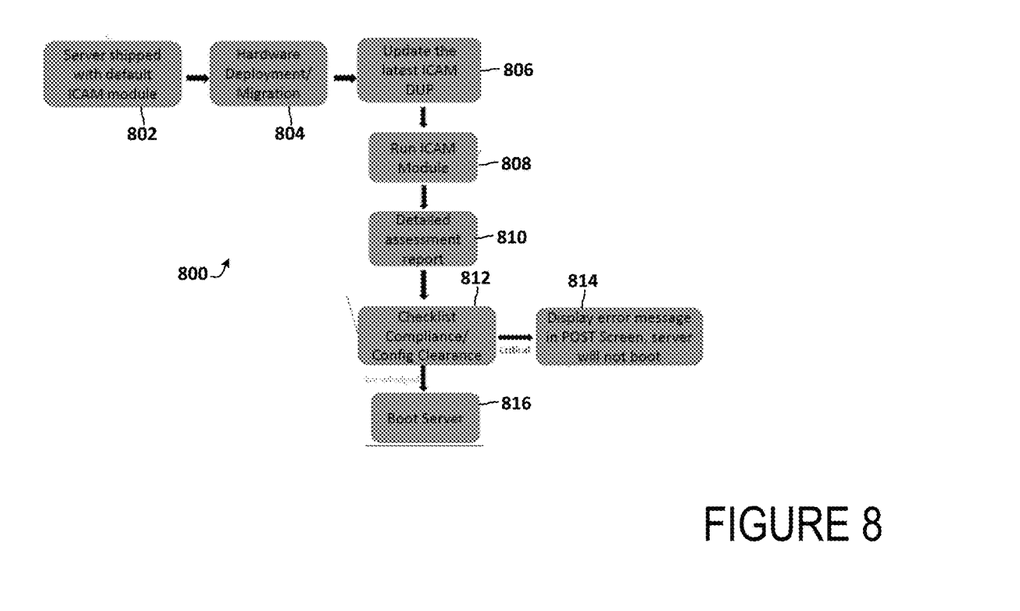
FIG. 8 illustrates a representative CAM workflow.

FIG. 8 illustrates a representative workflow 800 that may be employed. A server or other information handling system is shipped (block 802) with a default CAM and a local database indicating the default supported configurations of a particular system. After deployment (block 804) or migration of any new hardware, the configuration database may be updated (block 806) with the most recent configuration information. As discussed previously, the CAM 120 may monitor configuration information including, without limitation, manufacturer detail, hardware locations including slot information, specification details, warranty information. The reference configuration module may include slot priority information including a slot matrix table similar to the PCIe slot matrix table 400 of FIG. 4, a reference DIMM matrix table similar to the DIMM configuration information described with respect to FIG. 5, FIG. 6, and FIG. 7, CPU slot information, whitelisted and blacklisted hardware information, warranty details for supported cards and so forth.

After updating the supported configuration information in the CAM 120 may be run (block 808) to generate (block 810) a detailed assessment report indicating one of three status conditions for each installed hardware components: Acknowledged, Warning, and Critical. Any warning or critical status may be accompanied with a recommendation. For example, "A NIC card installed in Slot 4 conflicts with a slot priority information indicating Slot 2 as the required or optimal slot." In some embodiments, a critical compliance feature may be enabled to prevent an information handling system exhibiting a critical failure from booting to the operating system. Thus, compliance clearance settings may be checked (block 812). If a critical compliance features is enabled and the information handling system exhibits one or more critical warnings, the CAM may display (block 814) an error message, e.g., during power on self-test (POST), indicating that the server will not be booted until the critical configuration issue is resolved. If the CAM discovers no critical configuration issues, the server may be booted to a functional state (block 816).

Figure 9:
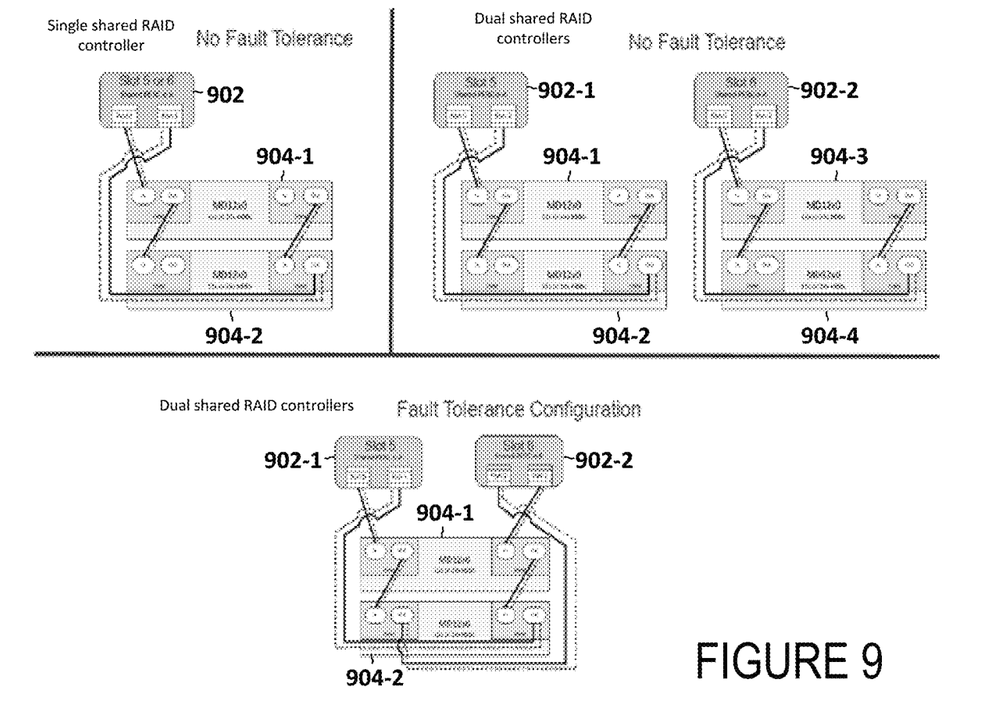
FIG. 9 illustrates additional configuration information that may be captured by disclosed subject matter.

FIG. 9 illustrates additional configuration information that may be captured, monitored, and analyzed by CAM 120. Configuration information indicative of RAID controller to JBOD enclosure configuration settings and connections is represented for three scenarios involving one or two shared RAID controllers 902 controlling two or four JBOD enclosures 904.

Figure 10:
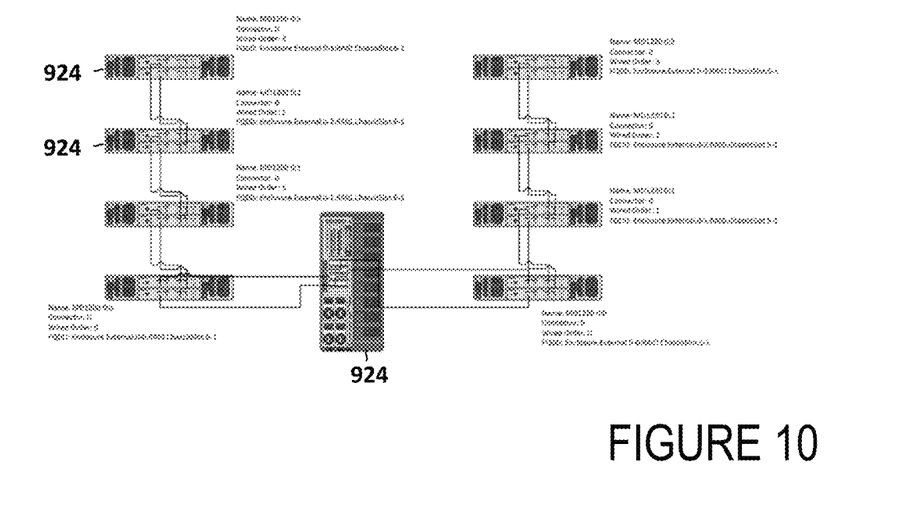
FIG. 10 illustrates still additional configuration information that may be captured by disclosed subject matter.

FIG. 10 illustrates addition configuration information that may be captured, monitored, and analyzed by CAM 120, including configuration information indicative of interconnections between a plurality of JBOD enclosures 922 and RAID controller adapters 924 in a chassis system.

Figure 11:
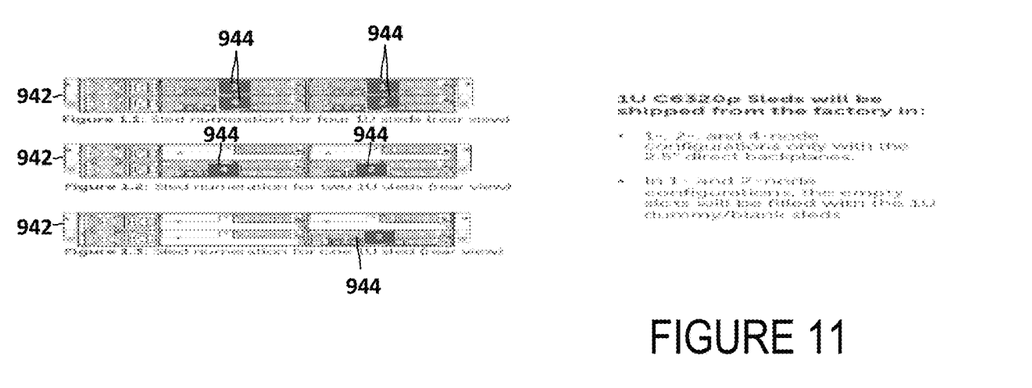
FIG. 11 illustrates still additional configuration information that may be captured by disclosed subject matter.

FIG. 11 illustrates addition configuration information that may be captured, monitored, and analyzed by CAM 120 including information indicative of the numerations of CPU sleds 944 in bays or slots of a chassis system 942.

Any one or more processes or methods described above, including processes and methods associated with the any flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A method for managing an information handling system, the method comprising:
    obtaining configuration information indicative of a current configuration of one or more resources of the information handling system, wherein the one or more resources include one or more peripheral component interconnection express (PCIe) resources;
    comparing the current configuration for a match with any of one or more supported configurations;
    responsive to the current configuration not matching any of the one or more supported configurations, performing exception operations wherein the exception operations include:
        responsive to determining the current configuration comprises a working solution configuration, updating a database of supported configuration's to include the current configuration; and
        responsive to determining that the current configuration comprises an exception configuration:
            indicating a proposed solution responsive to detecting a match between the current configuration and any of one or more previously encountered exception configurations, wherein each of the one or more previously encountered exception configuration comprises a non-functional or suboptimal configuration;
            verifying that the proposed solution complies with PCIe matrix information indicative of preferred slot placements for each of the one or more PCIe resources; and
            responsive to detecting subsequent resolution of the suboptimal configuration, recording the suboptimal configuration as one of the one or more previously encountered exception configurations;
    storing information indicative of supported configurations in a local configuration database, stored on a baseboard management controller of the information handling system; and
    periodically synchronizing the local configuration database with a management configuration database.

2. The method of claim 1, further comprising:
    generating an assist report indicative of one or more configuration exceptions in the current configuration; and
    responsive to identifying a resolved configuration resolving the one or more configuration exceptions, associating the assist report with the resolved configuration to provide guidance for a subsequently encountered exception configuration.

3. The method of claim 1, wherein the one or more PCIe resources include one or more PCIe cards and wherein the PCIe matrix information includes card priority information and slot priority information identified by each of the one or more PCIe cards.

4. The method of claim 3, wherein the card priority information is indicative of priority between two or more PCIe cards that share a slot priority in common.

5. The method of claim 3, wherein the slot priority information is indicative of one or more preferred slots for each of the one or more PCIe resources.

6. The method of claim 1, wherein the one or more resources of the information handling system include one or more dual in-line memory module (DIMM) resources.

7. The method of claim 6, wherein the configuration information includes DIMM configuration indicative of whether the one or more DIMM resources are configured in a balanced memory configuration.

8. The method of claim 6, wherein the configuration information indicates a rank, capacity, speed, and vendor of each DIMM resource.

9. The method of claim 1, wherein the configuration information indicates connections between one or more redundant array of inexpensive disk (RAID) controllers and one or more disk enclosures.

10. The method of claim 1, wherein the configuration information including information indicative of associations between modular resources and chassis slots.

11. The method of claim 1, further comprising:
    establishing the local configuration database, stored on the baseboard management controller of the information handling system, wherein the local configuration database is indicative of supported configurations; and
    periodically synchronizing the local configuration database with a management configuration database maintained on a management network remote from the information handling system and may receive configuration updates identifying new configurations from a plurality of managed information handling systems.

12. An information handling system, comprising:
    a processor;
    one or more resources coupled to the processor; and
    a baseboard management controller (BMC), the baseboard management controller including an embedded controller and BMC storage including controller executable BMC instructions stored in the BMC storage wherein the BMC instructions, when executed, cause the embedded controller to perform BMC operations comprising:
        obtaining configuration information indicative of a current configuration of one or more resources of the information handling system, wherein the one or more resources include one or more peripheral component interconnection express (PCIe) resources;
        comparing the current configuration for a match with any of one or more supported configurations; and responsive to the current configuration not matching any of the one or more supported configurations, performing exception operations wherein the exception operations include:
  responsive to determining the current configuration comprises a working solution configuration, updating a database of supported configurations to include the current configuration; and
  responsive to determining the current configuration comprises an exception configuration:
    indicating a proposed solution responsive to detecting a match between the current configuration and any of one or more previously encountered exception configurations, wherein each previously encountered exception configuration comprises a non-functional or suboptimal configuration;
    verifying that the proposed solution complies with PCIe matrix information comprising card priority information indicative of relative priorities of different PCIe cards and slot priority information indicative of preferred slot placements for a particular PCIe card; and
    responsive to detecting subsequent resolution of the suboptimal configuration, recording the suboptimal configuration as one of the one or more previously encountered exception configurations;
  storing information indicative of supported configurations in a local configuration database, stored on the baseboard management controller; and
  periodically synchronizing the local configuration database with a management configuration database.

13. The information handling system of claim 12, wherein the resources include a plurality of PCIe resources and wherein the current configuration includes PCIe slot information for each PCIe resource.

14. The information handling system of claim 12, wherein the resources include a plurality of dual in-line memory modules (DIMMs) and a plurality of DIMM slots and wherein the configuration information is indicative of:
  a rank, capacity, speed, and vendor of each of the plurality of DIMMs; and
  whether the plurality of DIMMs are configured in a balanced memory configuration.

15. The information handling system of claim 12, wherein the BMC operations include:
  creating a local configuration database indicative of supported configurations; and
  synchronizing, from time to time, the local configuration database with a management configuration database maintained on a management network remote from the information handling system and.

16. A baseboard management controller (BMC), comprising:
  an embedded controller;
  a network interface configured to establish an out of band connection with a management server; and
  BMC storage including controller executable BMC instructions stored in the BMC storage wherein the BMC instructions, when executed, cause the embedded controller to perform BMC operations comprising:
    obtaining configuration information indicative of a current configuration of one or more resources of an information handling system, wherein the one or more resources include one or more peripheral component interconnection express (PCIe) resources;
    comparing the current configuration for a match with any of one or more supported configurations; and
    responsive to the current configuration not matching any of the one or more supported configurations, performing exception operations wherein the exception operations include:
      responsive to determining the current configuration comprises a working solution configuration, updating a database of supported configurations to include the current configuration; and
      responsive to determining the current configuration comprises an exception configuration:
        indicating a proposed solution responsive to detecting a match between the current configuration and any of one or more previously encountered exception configurations, wherein each previously encountered exception configuration comprises a non-functional or suboptimal configuration;
        verifying the proposed solution complies with PCIe matrix information indicative of preferred slot placements for each of the PCIe resources; and
        responsive to detecting subsequent resolution of the suboptimal configuration, recording the suboptimal configuration as one of the one or more previously encountered exception configurations;
    storing information indicative of supported configurations in a local configuration database, stored on the baseboard management controller; and
    periodically synchronizing the local configuration database with a management configuration database.

17. The BMC of claim 16, wherein the resources include a plurality of dual in-line memory modules (DIMMs) and a plurality of DIMM slots and wherein the configuration information is indicative of:
  a rank, capacity, speed, and vendor of each of the plurality of DIMMs; and
  whether the plurality of DIMMs are configured in a balanced memory configuration.

18. The BMC of claim 16, wherein the BMC operations include:
  creating a local configuration database indicative of supported configurations; and
  synchronizing, from time to time, the local configuration database with a management configuration database maintained on a management network remote from the information handling system.

* * * * *